May 12, 1970 — C. J. HOLTKAMP — 3,511,167
COOKING OVEN
Filed Sept. 12, 1968
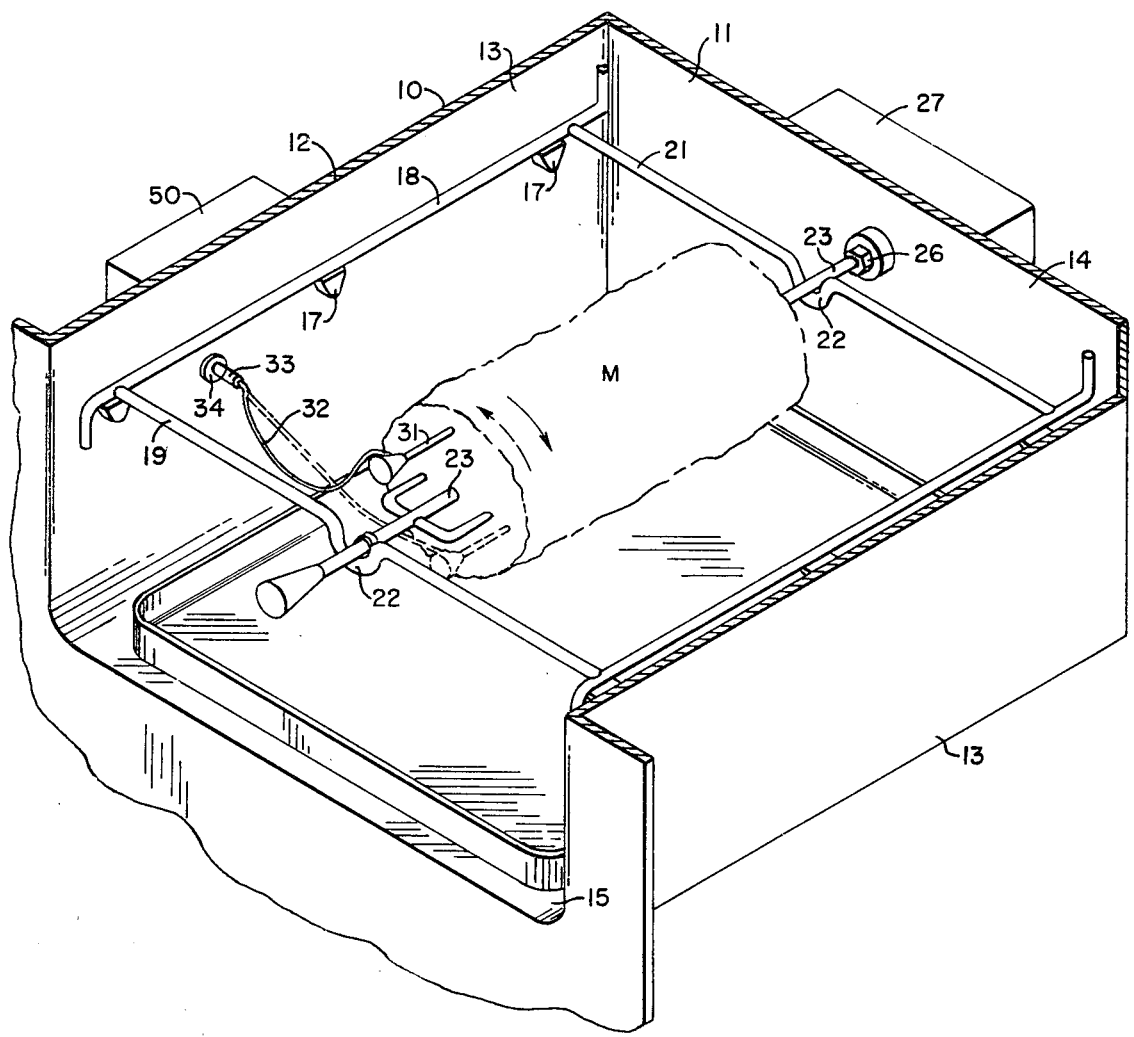
WITNESSES
Helen M. Farkas
James F. Young
INVENTOR
Calvin J. Holtkamp
BY Edward C. Arenz
ATTORNEY United States Patent Office 3,511,167
Patented May 12, 1970

3,511,167
COOKING OVEN
Calvin J. Holtkamp, Mansfield, Ohio, assignor to Westinghouse Electric Corporation, Pittsburgh, Pa., a corporation of Pennsylvania
Filed Sept. 12, 1968, Ser. No. 759,336
Int. Cl. A47j 37/04
U.S. Cl. 99—343      5 Claims

ABSTRACT OF THE DISCLOSURE

A cooking oven having a rotisserie spit for meat to be cooked within the oven cavity wherein a probe-type meat temperature-responsive device is provided for insertion into the meat to be cooked on the rotisserie spit together with a cable connecting the probe with a plug adapted to be inserted into a receptacle in a wall of the oven so that the change in temperature of the meat being cooked is transmitted to a temperature-responsive device which may provide a visual indication of the temperature of the meat being cooked, or which may sound an alarm when a predetermined temperature of that meat is reached, or which may actually control the means supplying the heat to the oven to control the cooking of the meat. Since such direct connection by cable between the meat on the rotisserie spit and a fixed receptacle in a wall of the oven precludes continuous rotation of the spit and its meat, there is provided mechanism between the rotisserie spit motor and the spit itself which converts the rotary motion of the motor into oscillating motion of the spit. Preferably such oscillation is through an arc of not much more than 360°, which prevents entanglement or wrapping of the cable about the spit and its meat.

BACKGROUND OF THE INVENTION

It has been common practice for some time to provide, for meat or other foodstuffs being cooked in a cooking oven, where the meat is stationary within the oven, a probe-type of control or indicator which includes a temperature-responsive device insertable into the meat being cooked, together with a flexible cable for conducting electrical signals from the cooking meat to a temperature-responsive device located either within the oven or, more commonly, exteriorly of the oven. Sometimes this temperature-responsive device has been a direct reading thermometer which merely indicated to the housewife the temperature of the meat being cooked. In other arrangements the temperature-responsive device included a signalling device in the form of a buzzer or the like to warn the housewife that the meat was cooked to the pre-selected temperature. In still other arrangements, the temperature-responsive device has been used to control the source of heat for the oven to automatically terminate cooking when the desired temperature of the meat was reached. An even more sophisticated device of this general type is one wherein the temperature-responsive device gradually reduced the oven temperature through a series of progressively lower temperatures in response to the temperature-sensing means of the probe sensing a series of progressively higher internal temperatures of the meat. Such a device is disclosed and claimed in my Pat. No. 2,914,644.

Such prior art devices were limited to use with stationary food items to be cooked, as distinguished from rotisserie cooking wherein the article is continuously rotated on a spit, this restriction being due to the flexible cable extending between the probe which was inserted into the stationary meat or the foodstuff and the insertion of the plug at the other end of the cable into a fixed receptacle in a wall of the oven.

With the increased popularity of rotisserie cooking, which increased popularity may be in large part due to the automatic basting effect produced by rotisserie cooking, there was found to be a need for means for enabling a housewife to cook on a rotisserie and still control the cooking by the use of a temperature-responsive device responding to changes in the internal temperature of the meat being cooked. The one solution proposed to this problem was to provide slip ring constructions for conducting a temperature produced signal from a rotating spit to a stationary receptacle in the oven wall. However, there are obvious disadvantages to a slip ring construction utilized in a heated region were greases and grease vapors are present to eventually contaminate and interfere with proper operation of the slip ring construction.

SUMMARY OF THE INVENTION

The present invention eliminates the necessity for use of slip ring constructions with rotisserie spits for the cooking of meats in that, instead of continuously rotating the spit in a single direction, I have provided an oscillating spit wherein the oscillation preferably occurs through an arc within a range of about 100° to about 540°. With the oscillation so limited, it is possible to use a meat probe connected to an oven receptacle by a flexible cable of limited length without any signal-transmitting problems.

DESCRIPTION OF THE DRAWING

In the drawing the single figure is a fragmentary perspective view of an oven equipped with an oscillating rotisserie spit constructed in accordance with the present invention, and with the top of the oven and the door thereto omitted for the purpose of clarity.

DESCRIPTION OF THE PREFERRED EMBODIMENT

In the single figure of the drawing there is shown an oven 10 including wall structure 11 defining an oven liner 12 defined by opposed side walls 13, a rear wall 14, a bottom wall 15 and a top wall (not shown).

One or more of the oven liner walls would be provided with heating means (not shown) and usually such heating means would be carried at least by the upper wall of the oven liner. Frequently, additional heating means are carried by the bottom wall also, although such heating means have been omitted from the showing of the drawing in order to simplify the disclosure.

The opposed oven side walls 13 are provided with the usual protuberances 17 which serve to support a removable rack 18. This rack 18 includes transversely extending front and rear bars 19 and 21, each of which is provided, midway of its length, with a depressed portion 22, serving as a bearing area for the front and rear ends of the conventional rotisserie spit 23.

As is customary with such rotisserie spits, the rear end thereof is slidingly received into a driving socket member 26, the interior of the socket member and the exterior of the spit rearmost portion having mating non-circular surfaces to provide driving connection from the socket member 26 to the spit.

Externally of the rear wall 14 of the oven liner is disposed a motor and motion-translating mechanism indicated broadly by the reference character 27. This motor mechanism is electrically driven and includes means for translating the continuous rotary motion of the motor itself to oscillating movement of the drive coupling member 26. Since the particular mechanism utilized to convert the rotary motion of the motor to oscillatory motion of the coupling and spit forms no part of the present invention and could be easily worked out by any one familiar with motor drive linkages, the details of such coupling means or motion-translating means are not shown herein. Such devices are generally available on the market and hence the description of one here would needlessly enlarge the present specification.

In the figure the reference character M indicates a meat roast positioned on the spit for cooking within the oven during oscillatory movement of the spit in the manner just described.

To indicate to the housewife the changing internal temperature of the meat during its cooking, there is provided a conventional probe-type temperature-sensing device 31 which is connected electrically through cable 32 to a plug 33 receivable in a receptacle 34 mounted on the side wall of the oven liner. Preferably, although not necessarily, the probe 31 is of the electrical resistance type which was fully disclosed in my noted prior patent. For a more detailed description of a probe of this type and the circuitry in which it has a part, reference may be had to said patent.

The receptacle 33 is electrically connected with a temperature-responsive deivce, indicated broadly by the reference character 50, disposed exteriorly of the oven cavity and adapted to perform any desired function such as those previously discussed in the first part of this application. As therein indicated, this device 50 might function purely as a thermometer to indicate to the housewife the existing and changing internal temperature of the meat being cooked, or may provide an alarm to alert the housewife to the fact that the meat has reached a predetermined or preselected temperature, or may serve to actually terminate the cooking operation upon the sensing by the probe 31 of the desired internal temperature of the meat. In a more sophisticated arrangement, the temperature responsive device 50 may function to gradually reduce the amount of heat supplied to the meat as the internal temperature of the meat gradually increases. Such an arrangement is disclosed in the previously identified patent.

While the arc through which the rotisserie spit is rotated may vary under different circumstances and can best be determined by actual trial and error, tests have indicated that very satisfactory cooking conditions are effected, particularly as to self basting, by oscillating the spit through an arc of about 270°. However, it will be apparent that an arc of as little as 100° may be sufficient to provide suitable and uniform cooking of the meat and it will also be apparent that the arc may be as great as 540° without creating any tangling problem with respect to the cable 32.

It is believed that it will be clear from the above description that the present invention provides a very simple solution to the problem of controlling cooking of meats by sensing the temperature of the meat as it is cooked while still using the rotisserie principle for cooking and self basting. It should also be apparent that the conventional probe frequently furnished with ovens for sensing the internal temperature of stationary meats being cooked in an oven may be used for rotisserie cooking in accordance with the present invention.

While the invention has been shown in but one form, it will be obvious to those skilled in the art that it is not so limited but is susceptible of various changes and modifications without departing from the spirit thereof.

What is claimed is:

1. A cooking oven having a cooking cavity, support means, a rotisserie spit on the support means for oscillation thereon within the oven cavity, motor means associated with the oven, means coupling the motor means and the spit so that the motor effects oscillation of the spit, a probe-type meat temperature-sensing device adapted to be inserted into meat carried by the spit, an electrical plug, an electric cable operatively connecting the temperature-sensing device and the plug, a receptacle within the oven for reception of the plug, and a temperature-responsive device electrically connected with the receptacle and adapted to respond to changes in the internal temperature of the meat carried by the spit as sensed by the temperature-sensing device.

2. Structure as specified in claim 1, wherein the temperature-responsive device provides a visual indication of the internal temperature of the meat.

3. Structure as specified in claim 1, wherein the probe-type temperature-sensing device is of the electrical resistance type.

4. Structure as specified in claim 1, wherein the means coupling the motor and the spit produces oscillation of the spit through arcs within a range of about 100° to about 540°.

5. Structure as specified in claim 1, wherein the temperature-responsive device is disposed exteriorly of the oven cavity.

References Cited
UNITED STATES PATENTS

| | | | |
|---|---|---|---|
| 2,787,948 | 4/1957 | Mathis | 99—421 |
| 3,089,407 | 5/1963 | Kinkle | 99—421 XR |
| 3,353,476 | 11/1967 | Goodman et al. | 99—421 XR |

FOREIGN PATENTS 642,856   6/1962   Canada.

BILLY J. WILHITE, Primary Examiner

U.S. Cl. X.R.

73—352; 99—421